US012688753B2

(12) United States Patent
Macke et al.

(10) Patent No.: US 12,688,753 B2
(45) Date of Patent: Jul. 21, 2026

(54) FACILITATING HAND COUNT-BASED PROGRESSIVES IN ELECTRONIC GAMING ENVIRONMENTS

(71) Applicant: Primero Games, LLC, Norcross, GA (US)

(72) Inventors: Michael Mayo Macke, Norcross, GA (US); Gregory S. Gronau, Norcross, GA (US); Jeremy M. Meister-Gronau, Norcross, GA (US); Mark C. Nizdil, Norcross, GA (US)

(73) Assignee: PRIMERO GAMES, LLC, Norcross, GA (US)

( * ) Notice: Subject to any disclaimer, the term of this patent is extended or adjusted under 35 U.S.C. 154(b) by 0 days.

(21) Appl. No.: 18/333,848

(22) Filed: Jun. 13, 2023

(65) Prior Publication Data

US 2023/0326294 A1 Oct. 12, 2023

Related U.S. Application Data

(63) Continuation of application No. 17/119,501, filed on Dec. 11, 2020, now Pat. No. 11,721,169.

(60) Provisional application No. 62/946,843, filed on Dec. 11, 2019.

(51) Int. Cl.
*G07F 17/32* (2006.01)
*G06F 7/58* (2006.01)
*G07F 17/42* (2006.01)

(52) U.S. Cl.
CPC .......... *G07F 17/3258* (2013.01); *G06F 7/582* (2013.01); *G07F 17/3267* (2013.01); *G07F 17/42* (2013.01)

(58) Field of Classification Search
CPC ... G07F 17/3258; G07F 17/3267; G06F 7/582
See application file for complete search history.

(56) References Cited

U.S. PATENT DOCUMENTS

| | | | |
|---|---|---|---|
| 5,276,312 A | 1/1994 | McCarthy | |
| 5,655,961 A * | 8/1997 | Acres .................... | G07F 17/323 |
| | | | 463/25 |
| 5,885,158 A * | 3/1999 | Torango ................. | G07F 17/32 |
| | | | 463/27 |
| 6,656,046 B1 | 12/2003 | Yoseloff et al. | |
| 7,004,837 B1 | 2/2006 | Crowder, Jr. et al. | |
| 7,699,703 B2 | 4/2010 | Muir et al. | |
| 8,277,319 B2 | 10/2012 | Gong | |
| 8,319,601 B2 | 11/2012 | Gelman et al. | |
| 8,469,799 B2 | 6/2013 | Cole | |
| 8,900,053 B2 * | 12/2014 | Graham ................. | G07F 17/32 |
| | | | 463/27 |

(Continued)

*Primary Examiner* — Chase E Leichliter

(74) *Attorney, Agent, or Firm* — Bradley Arant Boult Cummings LLP; Adam J. Thompson, Esq.

(57) ABSTRACT

A system and method for providing progressive awards can include a computing device in communication with a memory. The computing device can generate outcomes for a wagering game using a bet amount. The outcome can include one or more indicia. The computing device can update a progressive value using the bet amount and determine if a progressive threshold is satisfied based on an accrued hand count. In response to the progressive threshold being satisfied, the computing device can provide an award based on the progressive value.

20 Claims, 6 Drawing Sheets

(56) References Cited

U.S. PATENT DOCUMENTS

| | | | |
|---|---|---|---|
| 8,986,111 B2 * | 3/2015 | Cuddy | G07F 17/3258 463/42 |
| 9,105,153 B2 | 8/2015 | Betts et al. | |
| 9,454,878 B2 * | 9/2016 | Milligan | G07F 17/3272 |
| 9,640,035 B2 | 5/2017 | Nguyen et al. | |
| 9,997,007 B2 * | 6/2018 | Acres | G07F 17/3258 |
| 10,083,567 B2 | 9/2018 | Hollibaugh et al. | |
| 10,217,319 B2 | 2/2019 | Gagner et al. | |
| 11,721,169 B2 * | 8/2023 | Macke | G07F 17/3267 463/27 |
| 2003/0017870 A1 | 1/2003 | Klein | |
| 2003/0232640 A1 * | 12/2003 | Walker | G07F 17/3232 463/16 |
| 2004/0087360 A1 * | 5/2004 | Chamberlain | G07F 17/32 463/25 |
| 2007/0060314 A1 * | 3/2007 | Baerlocher | G07F 17/3258 463/25 |
| 2007/0060321 A1 * | 3/2007 | Vasquez | G07F 17/32 463/27 |
| 2007/0167210 A1 * | 7/2007 | Kelly | G07F 17/3232 463/16 |
| 2007/0191088 A1 * | 8/2007 | Breckner | G07F 17/3258 463/20 |
| 2007/0218975 A1 * | 9/2007 | Iddings | G07F 17/3223 463/25 |
| 2008/0248865 A1 * | 10/2008 | Tedesco | G07F 17/32 463/25 |
| 2008/0287185 A1 * | 11/2008 | Yoseloff | G07F 17/3258 463/27 |
| 2009/0042645 A1 * | 2/2009 | Graham | G07F 17/32 463/20 |
| 2009/0061990 A1 | 3/2009 | Schwartz | |
| 2009/0069076 A1 * | 3/2009 | Silvestro | G07F 17/3232 463/25 |
| 2009/0111561 A1 * | 4/2009 | Dewaal | G07F 17/32 463/20 |
| 2009/0124357 A1 | 5/2009 | Acres | |
| 2010/0048305 A1 | 2/2010 | Koplin | |
| 2010/0062836 A1 | 3/2010 | Young | |
| 2010/0062837 A1 | 3/2010 | Young | |
| 2010/0081497 A1 * | 4/2010 | Wolf | G07F 17/32 463/43 |
| 2010/0227671 A1 | 9/2010 | Laaroussi et al. | |
| 2011/0081964 A1 * | 4/2011 | Acres | G07F 17/3244 463/20 |
| 2011/0130191 A1 * | 6/2011 | Englman | G07F 17/32 463/20 |
| 2011/0269523 A1 * | 11/2011 | Nicely | G07F 17/3258 463/18 |
| 2012/0289325 A1 * | 11/2012 | Kyte | G07F 17/3258 463/27 |
| 2013/0053116 A1 | 2/2013 | Haushalter | |
| 2013/0090156 A1 * | 4/2013 | Oh | G07F 17/3267 463/25 |
| 2013/0095912 A1 | 4/2013 | Walker et al. | |
| 2013/0095918 A1 * | 4/2013 | Cuddy | G07F 17/3255 463/27 |
| 2013/0157746 A1 * | 6/2013 | Ellis | G07F 17/3267 463/23 |
| 2013/0252720 A1 * | 9/2013 | Milligan | A63F 9/24 463/27 |
| 2014/0045587 A1 * | 2/2014 | Johnson | G07F 17/3258 463/26 |
| 2015/0045105 A1 * | 2/2015 | Leslie | G07F 17/3244 463/20 |
| 2016/0189485 A1 * | 6/2016 | Ellis | G07F 17/3255 463/25 |
| 2016/0379447 A1 * | 12/2016 | Kaneyoshi | G07F 17/3272 463/27 |
| 2016/0379448 A1 * | 12/2016 | Okuaki | G07F 17/3225 463/17 |
| 2017/0161987 A1 | 6/2017 | Bulzacki et al. | |
| 2017/0221309 A1 * | 8/2017 | Hughes | G07F 17/3258 |
| 2017/0236372 A1 | 8/2017 | Bulzacki et al. | |
| 2017/0330419 A1 * | 11/2017 | Munakata | G07F 17/3227 |
| 2019/0051111 A1 * | 2/2019 | Milligan | G07F 17/3272 |
| 2019/0251792 A1 * | 8/2019 | Lamb | G07F 17/3211 |
| 2020/0294359 A1 * | 9/2020 | Bulzacki | G07F 17/3258 |
| 2020/0302743 A1 * | 9/2020 | Meister-Gronau | G07F 17/3241 |
| 2021/0183205 A1 * | 6/2021 | Meister-Gronau | G06Q 20/045 |
| 2021/0319659 A1 * | 10/2021 | Meister-Gronau | G07F 17/3244 |
| 2023/0326294 A1 * | 10/2023 | Macke | G06Q 20/045 463/27 |

* cited by examiner

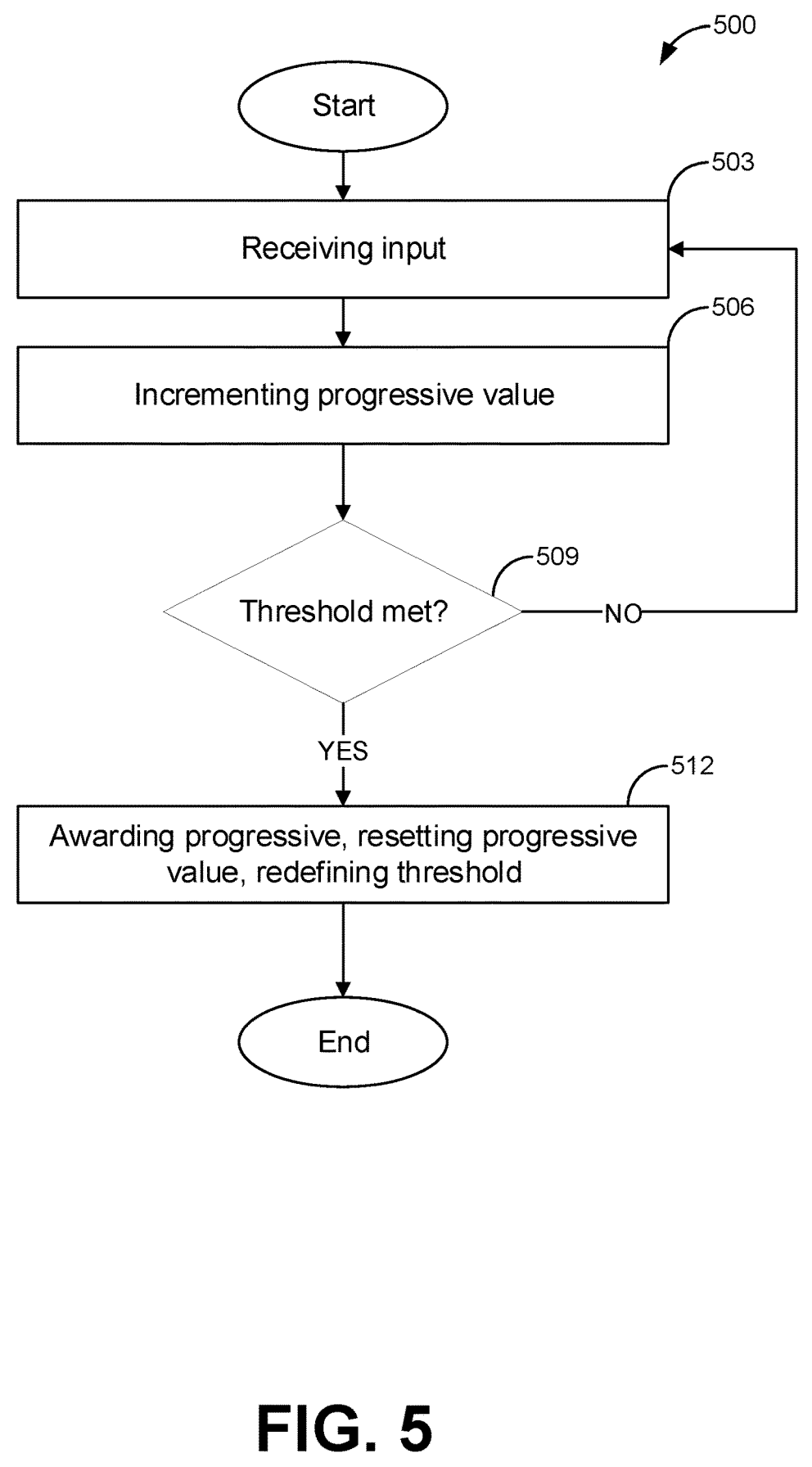

500

Start

503

Receiving input

506

Incrementing progressive value

509

Threshold met?

NO

YES

512

Awarding progressive, resetting progressive value, redefining threshold

End

FIG. 5

FACILITATING HAND COUNT-BASED PROGRESSIVES IN ELECTRONIC GAMING ENVIRONMENTS

CROSS-REFERENCE TO RELATED APPLICATIONS

This application is a continuation of U.S. patent application Ser. No. 17/119,501, filed Dec. 11, 2020 and entitled "FACILITATING HAND COUNT-BASED PROGRESSIVES IN ELECTRONIC GAMING ENVIRONMENTS," which claims the benefit of, and priority to, U.S. Provisional Patent Application No. 62/946,843, filed Dec. 11, 2019 and entitled "SYSTEMS AND METHODS FOR FACILITATING HAND COUNT-BASED PROGRESSIVES IN ELECTRONIC GAMING ENVIRONMENTS," the entire contents of which are incorporated herein by reference in their entireties.

TECHNICAL FIELD

The present systems and methods relate generally to configuring progressive award mechanisms based on hand counts.

BACKGROUND

Previous solutions to facilitating payout events on gaming devices, and the like, fail to provide systems and methods for providing progressive award mechanisms based on stored and transferred hand counts. For example, previous solutions may provide progressive award mechanisms based only on whether or not a particular award was achieved while a maximum denomination value was selected on a gaming device. Accordingly, there exists a long-felt, but unresolved need for systems and methods that can configure, assign, and process progressives and progressive awards based on hand counts obtained within and across gaming environments.

SUMMARY OF THE DISCLOSURE

The present systems and methods relate generally to facilitating hand count transfers in a gaming environment and providing bonusing using hand counts. Briefly described, and according to one embodiment, aspects of the present disclosure relate generally to systems and methods for determining and updating hand counts, and for configuring progressive game experiences based on hand counts.

In at least one embodiment, as described herein, a "hand count" or "hand count credit" can refer to a number of instances of play initiated at one or more gaming devices, or the like, by one or more patrons. For example, a hand count can refer to a number of games initiated in a current gaming session provided via a gaming device. In the same example, for each game initiated, the patron that initiated the game may accrue a hand count credit. Hand counts may be used by various gaming devices, game services, and/or game applications to determine whether or not a gaming device, gaming service, and/or gaming application can provide a payout, and to determine a magnitude of payout which a gaming device, gaming service, and/or gaming application may provide. Hand counts may further be used by the present gaming devices, game services, and/or game applications to perform actions including, but limited to assigning one or more patrons to a progressive, configuring progressive thresholds for progressive assignments and/or progressive awards, and awarding progressive awards.

In an exemplary scenario, a gaming device may facilitate and provide a plurality of outcomes for one or more wagering games for a patron that initiated the wagering games. For each initiated wagering game, the gaming device, or other element connected thereto, may increment a hand count. The patron may initiate a payout to receive a current balance of credits (e.g., dollars, euros, yuan, or other currency or prize accrued via the plurality of outcomes). However, the gaming device may restrict the value of the payout to a value equal to a predefined multiple of the hand count. For example, the gaming device may restrict the payout value to a value equal to $5 times the hand count. Accordingly, there may be an incentive for a patron to achieve a sufficient number of hand counts such that a full value of a payout may be received.

In at least one embodiment, following a payout, a gaming device may decrement the current hand count based on the multiple of hand counts used to determine the payout value. For example, prior to a payout of $50, a patron may have a current hand count of fifteen. To process a full payout, a gaming device may determine that the patron requires a hand count of ten (e.g., by computing $50 divided by $5) and possesses a hand count of at least ten. Also, to process the payout, the system may award the $50 payout value and decrement the patron's hand count by ten, thereby leaving the patron with a hand count of five. As another example, prior to a payout of $50, a patron may have a current hand count of five. To process a full payout, a gaming device may determine that the patron requires a hand count of ten (e.g., by computing $50 divided by $5) and possesses a hand count of five. Also, to process the payout, the system may award the $25 payout value, and may decrement the patron's hand count by 5, thereby leaving the patron with a hand count of zero.

In one or more embodiments, the present systems and methods may provide for storage and transfer of hand counts (e.g., that are associated with a particular patron, one or more patrons, or one or more patron sets). For example, a game application on a gaming device may increment and/or initialize a hand count value by receiving hand count credits from a database via a gaming service, via an attendant, or from some other manner. In the same example, upon receiving the hand count credits, the game application may initialize or increment a hand count value based on the transferred hand count credit. Also, upon transmitting the hand count credits, the gaming service may decrement a stored hand count value based on the number of transferred hand count credits. As another example, following payout and decrement of a hand count, a gaming device (or a component connected thereto) may transfer the remaining hand count (or decremented hand count value) to a gaming service. Upon receiving the remaining hand count, the gaming service can increment or decrement a stored hand count value based on the remaining hand count, thereby maintaining an accurate measurement of a patron's current hand count credits.

A progressive or progressive jackpot refers generally to a jackpot or bonus awarding mechanism that can be executed when a predetermined progressive trigger, such as a progressive threshold, is met or obtained. The progressive trigger can be achieved by any gaming device enrolled in the progressive jackpot. In one or more embodiments, a progressive threshold may be met by obtaining a winning outcome on a gaming device. In at least one embodiment, the progressive threshold may be a progressive value threshold that is satisfied when a progressive value is equal to or exceeds the progressive value threshold, which is sometimes referred to as a mystery progressive. The progressive value may increase as coin-in is played on any gaming devices enrolled in the progressive. In various embodiments, a progressive threshold may be a progressive hand count threshold that may be satisfied when a hand count value is equal to or exceeds the progressive hand count threshold. The hand count value may increase as hand counts are achieved on any gaming devices enrolled in the progressive. According to one embodiment, a progressive threshold may be a combination of one or more progressive value thresholds, one or more progressive hand count thresholds, and/or one or more other progressive thresholds or triggering mechanisms.

In a first example, a progressive threshold may be met by obtaining a particular sequence of indicia on a pay line of a gaming device. For example, a patron may initiate a wagering game at a gaming device. The gaming device may generate an outcome and compare a sequence of indicia on a pay line to a set of winning indicia, and may determine a match. The matched set of indicia may cause the progressive threshold to be satisfied, and cause the gaming device (and/or another gaming system element) to provide an award to the patron. In some embodiments, a maximum available bet must be placed on the wagering game in order to qualify for the progressive. The progressive threshold may be met only by obtaining a particular sequence of indicia on a particular pay line of the gaming device, such as a center line.

In a second example, a progressive value may be initially seeded to $10,000.00 and a progressive threshold may be seeded to a random number between $10,000.00 and $20,000.00, such as $15,945.00. In the same example, for each receipt of coin-in at one or more gaming devices, the progressive value may be incremented by a percentage of the coin-in received (e.g., about 1.0-3.0%). Continuing the same example, the progressive value may be iteratively incremented until an increment causes the current progressive value to meet or exceed the progressive value threshold. In the same example, when the progressive value reaches $15,945.00, the progressive value threshold may be satisfied, and a patron placing the wager with the gaming device that caused the threshold-satisfying coin-in contribution may receive an award (e.g., 15,945.00).

In a third example, a mystery progressive can be awarded based on hand counts. A progressive hand count value may be initially seeded to a pseudo-random seed for hand counts, a progressive value may be initially seeded to a pseudo-random seed for progressive value, and a progressive hand count threshold may be set to a random number between 500 and 1000 hand counts, which is 637 hand counts for this example. In the same example, for each initiation of a wagering game made by one or more patrons at one or more gaming devices, the progressive hand count value may be incremented by one (or a percentage thereof based on a configurable contribution percentage). Continuing the same example, the progressive value may be iteratively incremented with each receipt of coin-in (as described herein) at each gaming device. The progressive value may be iteratively incremented by a percentage of the coin-in amount. In the same example, when the progressive hand count value reaches or exceeds the random number (e.g., 637 hand counts), the progressive hand count threshold may be satisfied, and the gaming device that placed the wager that caused the threshold-satisfying hand count initiation may receive an award.

In at least one embodiment, progressive mechanisms ("progressives") may be organized into one or more tiers, or may be independent of a tier. A tier can include a set of progressive levels to which a patron may be assigned depending on one or more criteria, such as, for example, a quantity of hand count accumulated. Potential values of awards for one or more levels can increase as a patron is assigned from one progressive tier to the next progressive tier (e.g., as shown in FIG. 3). For example, in a first tier, a first progressive level may include a maximum jackpot payout of $1,000, a second progressive level may include a maximum jackpot payout of $3,000, and a third progressive level may include a maximum jackpot payout of $5,000, and in a second tier, a first progressive level may include a maximum jackpot payout of $5,000, a second progressive level may include a maximum jackpot payout of $25,000, and a third progressive level may include a maximum jackpot payout of $50,000. Also, in at least one embodiment, progressives in a tier can iteratively increase a maximum or current denomination that a patron may select on a gaming device (e.g., maximum or current denomination per wagering game). For example, a first progressive tier may restrict a maximum or current denomination to $0.01, a second progressive tier may increase the maximum or current denomination to $1.00, and a third progressive tier may increase the maximum or current denomination to $5.00. The term "tier" does not refer to each individual progressive level from a staggering of progressive levels concurrently assigned to a wagering game. Rather, the term "tier" as used herein refers to each set of one or more progressive levels where the set of progressive levels is concurrently assigned to a wagering game.

Assignment to each level or tier of progressive (or otherwise) can be determined by satisfying one or more individual or group thresholds. In at least one embodiment, the individual or group threshold can be an accrued hand count threshold. The accrued hand count threshold can be a measure of hand counts obtained by the individual or group. The measure of hand counts can include one or more of, but is not limited to, a measure of hand counts obtained by one or more patrons during one or more gaming sessions, a measure of hand counts obtained by one or more patrons during one or more time intervals, a measure of hand counts accrued during one or more gaming sessions on one or more gaming devices in one or more gaming environments (also during one or more time intervals), a measure of unredeemed hand counts obtained by one or more patrons, which can be stored in a patron data 318, and other individual or group-based hand count measures.

In one or more embodiments, a measure of hand counts can be compared to a set of individual or group accrued hand count thresholds, each individual or group accrued hand count threshold being associated with a tier of one or more progressive level. For example, a set of individual or group accrued hand count thresholds may include a first accrued hand count threshold of one hundred hand count credits (e.g., accrued in one or more gaming sessions) that is associated with a first tier of one or more progressive levels, a second accrued hand count of two hundred fifty historically accrued hand counts that is associated with a second tier of one or more progressive levels, and a third accrued hand count of five hundred historically accrued hand counts that is associated with a third tier of one or more progressive levels. In the same example, first progressive tier may provide one or more progressive levels with pay out amounts between $100-500, the second progressive tier may provide one or more progressive levels with pay out amounts between $1,000-5,000; and the third progressive tier may provide one or more progressive levels with pay out amounts between $10,000-50,000. Continuing the same example, a patron may have three hundred and fifty historically accrued hand counts, and, thus, may be assigned to the second progressive tier (e.g., until the patron obtains an accrued hand count measuring at least five hundred and is reassigned to the third progressive tier).

In various embodiments, the systems and methods may include specific actions performed upon a patron and/or set of patrons achieving, individually or in combination, specific levels of hand count credits. For example, a gaming system may include a set of hand count thresholds for individuals including, but not limited to a base threshold correlated to individuals with hand counts measuring within a first range of hand count credits (e.g., 0-10), an intermediate threshold correlated to individuals with hand counts measuring within a second range of hand count credits (e.g., 11-50), and a top threshold correlated to individuals with hand counts measuring within a third range of hand count credits (e.g., 51 or greater). In the same example, upon a patron obtaining an individual hand count of 51 hand count credits, the gaming system may determine that the patron has satisfied the top threshold, and may assign the patron to a one or more progressive levels associated with the top threshold. Each threshold may be associated with a particular progressive tier to which a patron or gaming device may be assigned upon satisfying the threshold. Moreover, each threshold may be configurable by an administrative user when setting up the progressive. Each progressive can include one or more progressive thresholds and one or more awards provided upon winning the one or more progressive thresholds. In at least one embodiment, values of awards may increase across progressives grouped into a tier (as described herein).

Exemplary awards may include, but are not limited to, hand count credits (e.g., sourced from designated pools of one or more patrons' hand count credits), temporary halting the restricting of payout amount based on available hand count credits or using accumulated hand count credits from an available pool to cover the payout amount, access to one or more online and/or on-site gaming environments (e.g., such as a particular level, zone, server, competitor pool, etc. of an online gaming environment), social prizes, such as, for example, digital currency, in-game digital items, access to digital content, and an indicia/banner, etc. that may be applied to a patron's online profile, signifying the patron's achieved hand count threshold, or the like, and on-premises perks, such as, for example, free beverage and/or food services, access to entertainment and other events, and upgrades to on-premises amenities (such as, for example, an upgraded suite, etc.).

Communal (e.g., group) progressives and progressive tiers may be included for groupings of patrons. The gaming system may include a communal hand count that is equivalent to a total sum of all hand counts held by a set of patrons currently playing wagering games on gaming devices connected to the gaming system. The communal hand count may be limited to hand counts accrued during a communal gaming session, time window, or event. The gaming system may further include a communal progressive tier including, but not limited to, a first progressive tier correlated to a set of patrons with a combined hand count measuring between within a first range of hand count credits (e.g., 0-1000), a second progressive tier correlated to a set of patrons with a combined hand count measuring within a second range of hand count credits (e.g., 1001-5000), and a third progressive tier correlated to a set of patrons with a combined hand count measuring within a third range hand count credits (e.g., 5001 or greater).

Each progressive in the tier may be associated with access to a particular denomination and/or a particular group of patrons whose coin-in contributions are provided to the same progressive. As an example, a count of patrons in a group may be greater in tiers corresponding to greater dollar amounts. In some embodiments, there may be several low-level tiers that feed into each higher level tier. Having a higher patron count for the group or an increased denomination can increase the contribution to enable payment of higher progressive awards.

Patrons may be grouped based on locations of gaming devices with which they are playing, times when the patrons play, whether the patrons are playing at the start of an event, a frequency of play over a predefined window/period of time by each patron, or by other means. The patrons can be grouped locally at a single facility or across multiple locations and facilities. Accordingly, a group of patrons (e.g., from which a combined hand count is calculated) may refer to all patrons engaged with gaming devices, such as at a particular location. Assignment to the first tier of one or more progressive levels may cause a portion of coin-in and/or hand count from all patrons in a single group to be contributed towards the first tier of progressive levels. Assignment to the second tier of one or more progressive levels may cause a portion of coin-in and/or hand count from all patrons in a group to be contributed towards the second tier of progressive levels (e.g., that may be greater than the first tier). Assignment to the third tier of one or more progressive levels may cause a portion of coin-in and/or hand counts from all patrons in the group to be contributed towards the third tier of one or more progressive levels (e.g., that may be greater than the second tier).

In some embodiments, the tiers of progressives can include an award pool and a hand count pool, such that hand counts in the pool can be used to cash out the award. The hand count contribution rate can be calculated based on the award contribution rate such that the hand count pool includes an exact or slightly greater number of hand counts necessary to cash out the progressive award. In some embodiments, the accrued progressive contribution amounts can roll into the next tier. As an example, contribution amounts from the first tier can roll into the second tier (and the second tier can roll into the third tier, etc.).

The accumulated award amounts for different levels in different tiers can be reset after each group event or can be carried forward until each award is won. If the tiers reset, an award can be paid out at the end of the group event. According to one example, a progressive level in a first tier can have a seed amount of $100 and a progressive level in a second tier can have a seed amount of $500. In the same example, if a patron or group moves from the first tier to the second tier, while the progressive level in the first tier is currently $127.37, the progressive level of the second tier can be initialized to $527.37 once the group moves into the second tier.

In at least one embodiment, threshold values to move across tiers may be dynamically calculated based on a number of factors, such as, for example, a number of patrons currently playing wagering games on gaming devices or a number of patrons assigned to a group. For example, thresholds may be equal to a predefined hand count value multiplied by a number of patrons currently playing wagering games on a set of gaming devices. In an exemplary scenario, a base threshold may include a lower bound of zero and an upper bound equal to three times the current number of patrons, an intermediate threshold may include a lower bound equal to one plus three times the current number of patrons and an upper bound equal to five times the current number of patrons, a top threshold may be equal to a lower bound of one plus five times the current number of patrons and an upper bound of ten times the current number of patrons (or the top threshold may not include an upper bound). As an example, a group of patrons may need to achieve the calculated threshold number of hand count to move from tier to tier.

In at least one embodiment, the present systems and methods may include digital and/or online gaming environments that provide online gaming sessions with or without wagering elements. For example, the system may include an online gaming environment in which non-wagering versions of wagering games (hosted on gaming devices) are provided to a patron. Further, wagering versions of a game may involve non-real money, such as digital currency that may or may not be converted to real money. Performance in the online gaming environment may cause the system to augment wagering game sessions subsequently initiated by the patron at one or more gaming devices. In an exemplary scenario, the system may increment the patron's stored hand count based on a number of non-wagering or digital currency wagering games initiated or played in the online gaming environment. For example, the patron may initiate fifty non-wagering games in the gaming environment, and a gaming service may detect and track the non-wagering game initiations or plays, and increment the patron's stored hand count by five (e.g., based on a predefined relation between non-wagering game plays and hand counts).

BRIEF SUMMARY OF THE DRAWINGS

For a more complete understanding of the embodiments and the advantages thereof, reference is now made to the following description, in conjunction with the accompanying figures briefly described as follows:

FIG. 5 illustrates an example flowchart of certain functionality implemented by portions of gaming service executed in a gaming system in the gaming environment of FIG. 3 according to various embodiments of the present disclosure.

Figure 1:
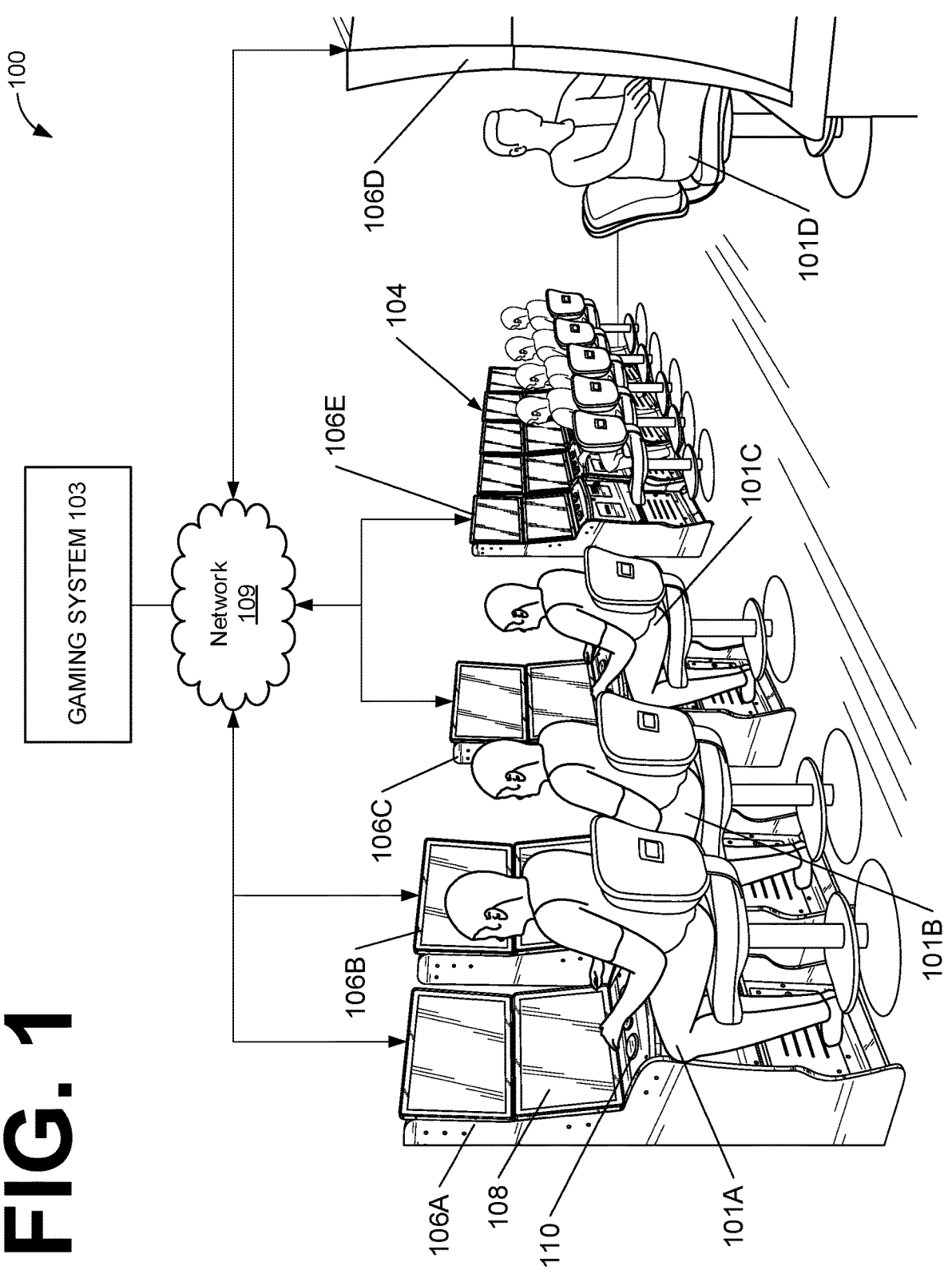
FIG. 1 shows an exemplary gaming area according to one embodiment of the present disclosure.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DESCRIPTION OF THE DRAWINGS

In the following paragraphs, the embodiments are described in further detail by way of example with reference to the attached drawings. In the description, well-known components, methods, and/or processing techniques are omitted or briefly described so as not to obscure the embodiments. As used herein, the "present disclosure" refers to any one of the embodiments described herein and any equivalents. Furthermore, reference to various feature(s) of the "present embodiment" is not to suggest that all embodiments must include the referenced feature(s).

Among embodiments, some aspects of the present disclosure are implemented by a computer program executed by one or more processors, as described and illustrated. As would be apparent to one having ordinary skill in the art, one or more embodiments may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The disclosed subject matter is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein, the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above. As used herein, the term "stated" is meant to indicate that a value, indicia, or other data is viewable and/or accessible to a patron. As used herein, the term "unstated" is meant to indicate that a value, indicia, or other data is not viewable and/or accessible to a patron. For descriptive purposes, various gaming system functions are described as being performed by particular gaming elements; however, no limitation of function of gaming elements is intended, and functions performed by one element of a gaming system may be performed by other elements of the gaming system, as would be appreciated and understood by one of general skill in the art.

Referring now to the figures, for the purposes of example and explanation of the fundamental processes and components of the disclosed systems and processes, reference is made to FIG. 1, which illustrates an exemplary gaming area 100 according to one embodiment of the present disclosure. As will be understood and appreciated, the exemplary gaming area 100 shown in FIG. 1 represents merely one approach or embodiment of the present system, and other aspects are used according to various embodiments of the present system.

An exemplary gaming area 100 can include, for example, one or more casino floors. The gaming area 100 can include a plurality of gaming devices 106A-E in communication with a gaming system 103 via a network 109. Each gaming device 106A-E is configured to execute wagering games, such as, for example, reel-based wagering games (e.g., electronic slot machines, etc.). To initiate wagering games, the plurality of gaming devices 106A-E can receive selections from patrons 101A-D at input devices 110. Each gaming device 106A-E includes one or more displays 108 on which the gaming device renders various information, such as outcomes of wagering games, victory criteria, prizes, values of coin-in, and hand count credits. The gaming system 103 can track the play of each patron 101A-D, for example, by assigning each patron 101A-D a unique identifier that is associated with each wagering game, pay-in event, and payout event initiated by the corresponding patron.

The gaming system 103 can record various metrics related to activities of the patrons 101A-D, including, but not limited to, total coin-in, total credits, total winnings, and hand counts. In response to a patron initiating a wagering game, the gaming system 103 can increment a meter for tracking the patron's accrued hand count. In response to a patron initiating a payout of an award, the gaming system 103 can decrement the patron's hand count meter based on a number of hand counts required to pay out the award (e.g., for example, a reward may be paid out at a rate of $5 per hand count, and some rewards may only be paid out in full).

The gaming system 103 can generate progressive awards, such as jackpots, by generating a random value within a predetermined range and based on a pseudo-random seed. The gaming system 103 can assign the value of the progressive reward to the random value and/or define a progressive reward threshold based on the random value. The gaming system 103 can track the progression of a patron towards a progressive reward as the patron moves throughout the gaming area 100 and initiates games at the various gaming devices therein.

The pseudo-random seed can be generated as a percentage of the coin in amount. As an example, the gaming service 315 may receive indication of a coin in of $1.00 from a gaming device 106 enrolled in a progressive 332. The gaming service 315 may utilize a percentage of the coin-in, such as 3% or 3 cents, to increment a current progressive value for progressive 332 and a smaller percentage of the coin-in to increment a seed amount, such as 0.1% or 0.1 cents. The seed amount can accumulate over time until the progressive is won, and the current seed amount can be used as the pseudo-random seed to seed a subsequent progressive. In one embodiment, the current value of the seed amount can be rounded down based on a denomination of the gaming device 106. For example, if the denomination of the game is $1, the pseudo-random seed can be set to the seed amount can be rounded down to the nearest $1. The pseudo-random seed can be subtracted from the seed amount, which can be incremented and later used for a subsequent progressive seed, such that the rounded down amount is not lost. As may be understood, technical or regulatory requirements may dictate that all contribution to a progressive be accounted. As such, the present system provides a technical solution for maintaining rounded portions of values by rolling those values into a next seed value.

The pseudo-random seed can be generated as a percentage of the hand counts. As an example, the gaming service 315 may receive indication of ten hand count from a gaming device 106 enrolled in a progressive 332, which may be indicated over time as each hand count is accumulated. The gaming service 315 may utilize a percentage of the hand count, such as 97% or 9.7 hand counts, to increment a current progressive hand count value for progressive 332 and a smaller percentage of the hand counts to increment a seed amount, such as 0.3% or 0.3 hand counts. The seed amount can accumulate over time until the progressive is won, and the current seed amount can be used as the pseudo-random seed to seed a subsequent progressive. In one embodiment, the current value of the seed amount can be rounded down to the nearest hand count. The rounded portion can be added to the seed amount for a next progressive such that the rounded down amount is not lost.

In an exemplary scenario, the gaming system 103 provides a progressive reward between $10,000-15,000 and computes a progressive reward threshold by generating a random value of $12,895 based on a pseudo-random seed. The gaming devices 106A-E initiate wagering games in response to input from each patron 101A-D and the gaming system 103 funds increments a progressive reward meter based on a portion of coin-in from the initiation of each wagering game. At a certain point, based on coin-in received at the gaming device 106A, the gaming system 103 increments the progressive reward meter and determines that the value of the progressive reward meter at least meets the progressive reward threshold of $12,895. In response to determining satisfaction of the progressive reward threshold, the gaming system 103 awards the progressive reward to the patron that initiated the threshold-crossing wagering game (e.g., the patron 101A). The progressive reward can be equal to the progressive reward threshold, the current progressive reward meter value, or a percentage of either (e.g., within the range of $10,000-15,000). The gaming system 103 can reset the progressive award and generate a new progressive reward threshold, for example, based on a portion of coin-in from the progressive reward meter.

The gaming system 103 can provide a progressive reward based on a determination that a patron has accrued a total hand count value in excess of a predetermined threshold (e.g., which may or may not be presented to the patron 101A). In an exemplary scenario, the gaming system 103 generates a progressive reward (e.g., as outlined above) and determines a progressive reward threshold by generating a random value of hand counts (e.g., or selecting a predefined hand count value). At a first time point, the gaming device 106A receives coin-in from the patron 101A and initiates a wagering game, thereby causing the gaming system 103 to increment a hand count meter with which the patron 101A is associated. The gaming system 103 can determine that the incremented hand count meter fails to meet the progressive reward threshold (e.g., the patron 101A has insufficient hand counts). The gaming device 106A can print a ticket that encodes a patron identifier and the value of the hand count meter. At a second, later time point the gaming device 106E can receive the printed ticket and coin-in from the patron 101A and initiates a wagering game, thereby causing the gaming system 103 to further increment the hand count meter. The gaming system 103 can determine that the incremented hand count meter meets the progressive reward threshold (e.g., the patron 101A now possesses a sufficient quantity of hand counts) and, in response to the determination, awards the progressive reward.

Based on respective values of accrued hand counts, the gaming system 103 can assign wagering games of each patron 101A-D to a progressive "tier" with which a progressive reward is associated (e.g., qualification for the progressive tier being required to pay into and potentially win the corresponding reward). In one example, the gaming system 103 determines that patrons 101A-D have 19, 17, 25, and 50 accrued hand counts, respectively. In the same example, the gaming system 103 assigns wagering games of patrons 101A-C to a first progressive tier (e.g., associated with hand count values of 1-25) and assigns wagering games of the patron 101D to a second progressive tier (e.g., associated with hand count values of 26-50). In this example, when wagering games are initiated, a portion of coin-in from patrons 101A-C funds a progressive jackpot associated with the first progressive tier and a portion of coin-in from patron 101D funds a second progressive jackpot associated with the second progressive tier.

The gaming system 103 can assign wagering games or patrons to communal progressive tiers in which additional jackpots or other rewards may be won (e.g., such as free meals, access to a particular wagering game, bonus prizes, etc.). The gaming system 103 can compute a communal hand count value by summing the accrued hand counts of patrons playing wagering games within particular zone 104 within the gaming area 100. The particular zone 104 can refer to a particular set of gaming devices 106 that are located in the same area, offer the same wagering game, or are otherwise grouped for the purposes of providing a communal progressive. The communal progressive tier can be generated for a predetermined time period (e.g, 15 minutes, 1 hour, etc.) and/or patrons may be disqualified from the tier in response to a particular action, such as leaving the particular zone 104 and/or initiating a payout at a gaming device located therein.

In an exemplary scenario, the gaming system 103 computes a communal hand count value of 75 by summing hand count values from the patrons 101A-C seated in a common row of gaming devices 106A-C. The gaming system 103 determines that the communal hand count value satisfies a cumulative progressive threshold of 50-100 hand counts and, in response, assigns current and/or subsequent wagering games of each patron 101A-C to a communal progressive tier. The gaming system 103 generates a communal progressive threshold based on a pseudo-random seed. As wagering games are initiated at the gaming devices 106A-C, the gaming system 103 funds a communal progressive reward based on a portion of coin-in from each patron 101A-C. In response to a determination that the communal progressive reward meets the communal progressive threshold, the gaming system 103 provides the communal progressive reward, a portion thereof, or another prize, to the patrons 101A-C.

Figure 2:
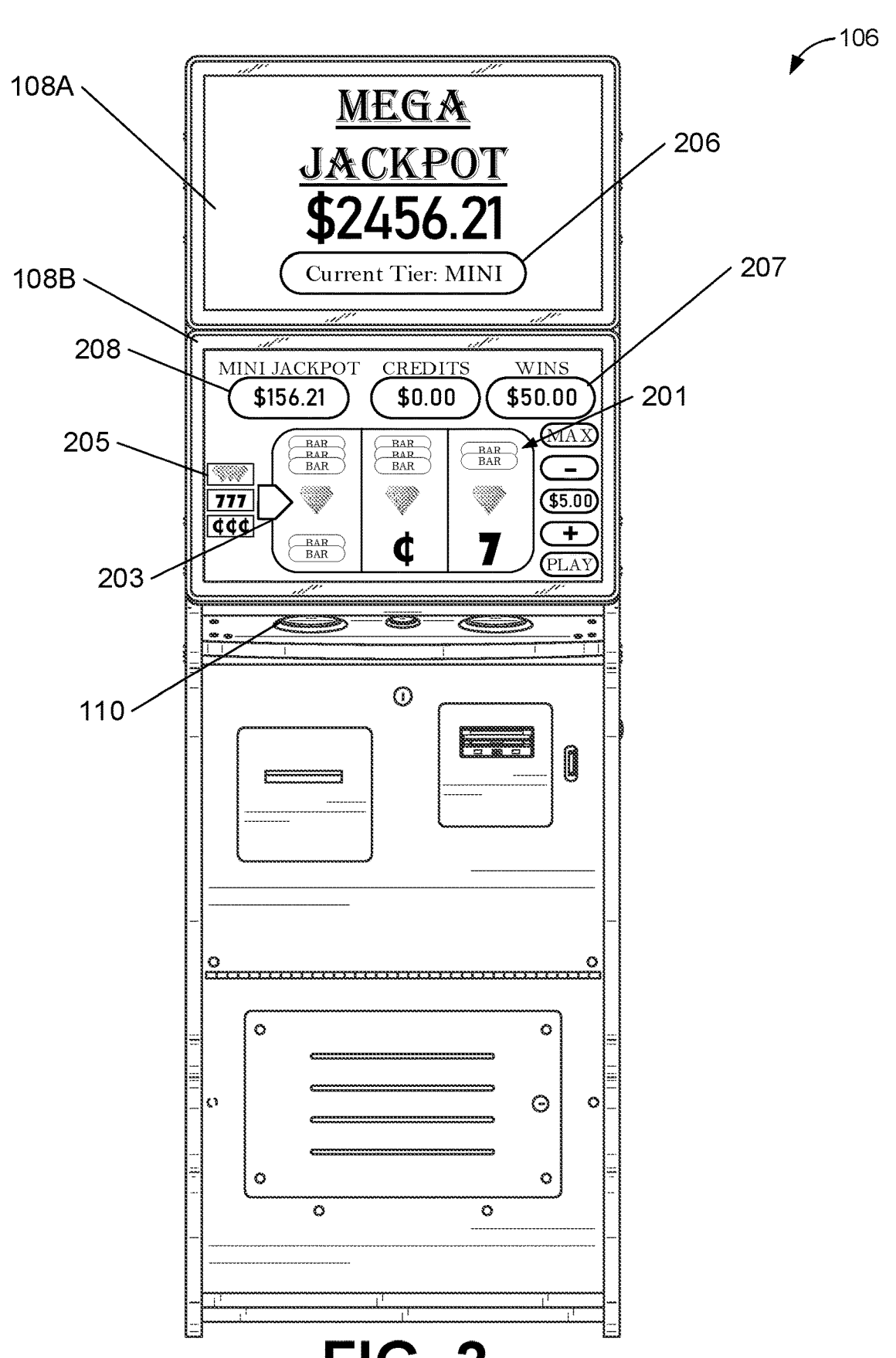
FIG. 2 shows an exemplary gaming device according to one embodiment of the present disclosure.

FIG. 2 shows an exemplary gaming device 106. Based on input, such as a patron inserting a player's card with a patron identifier into a player tracking module, the gaming device 106 (e.g., or a system in communication therewith) can retrieve user account data that corresponds to the patron identifier. For example, the gaming device 106 receives a patron identifier and retrieves a value of accrued hand counts with which the patron identifier is associated. In another example, a ticket is inserted into the gaming device 106, and the gaming device 106 reads the ticket to retrieve a value of accrued hand counts. In yet another example, the patron identifier can be received via a mobile device using near field communication or read from an RFID tag.

The gaming device 106 can generate wagering game outcomes, for example, by cycling a plurality of indicia 201 based on a pseudo-random seed value. The gaming device 106 can determine the outcome of a wagering game, for example, by comparing a plurality of indicia 201 that are in alignment with a payline 203 to a pay table 205 (e.g., which may or may not be viewable by patrons). The gaming device 106 can determine the pay table 205 based on input data, such as a value of accrued hand counts. In one example, the gaming device 106 determines that a patron identifier is associated with 10 accrued hand counts. In this example, the gaming device 106 assigns wagering games (e.g., initiated on behalf of the patron identifier) to a tier associated with hand count values of 5-10. Continuing the example, the gaming device 106 retrieves a pay table 205 based on the assigned tier and determines awards for wagering game outcomes based on (which as used herein, includes based at least in part on) the pay table 205.

The gaming device 106 can assign wagering games to a progressive award (e.g., such as a particular jackpot) based on the input data and/or a tier assignment. In one example, the gaming device 106 compares an accrued hand count value of 10 to a plurality of progressive thresholds including a "mini jackpot" threshold of 5-10 hand counts, a "minor jackpot" threshold of 11-25 hand counts, a "major jackpot" threshold of 26-50 hand counts, and a "mega jackpot" threshold of 51+ hand counts. In this example, based on the comparison the gaming device 106 assigns wagering games with which the accrued hand count value is associated to a "mini jackpot" progressive award. In the same example, the gaming device 106 can also assign the wagering games to a tier with which the mini jackpot threshold is associated. The gaming device 106 can display a tier assignment 206 on the display 108A or display 108B (though, in some embodiments, assigned tiers are not viewable by a patron). The gaming device 106 can display other information related to wagering games, such as, for example, winnings 207 and a jackpot value 208.

In an exemplary scenario, the input device 110 receives an input including a patron identifier and a coin-in value of $25. In response to the input, the gaming device 106 retrieves a stored hand count value of 1, compares the stored hand count value to a progressive threshold of 5-10 hand counts, and determines that the patron identifier (e.g., or a wagering game initiated for the same) does not qualify for a progressive jackpot. Over a period of play, the gaming device 106 receives 4 commands to initiate wagering games at a max bet of $5 and generates a total of four wagering game outcomes throughout the period of play. During the period of play, a payout input is not received, resulting in the patron accruing 4 hand counts and total winnings 207 of $50.00 (e.g., based on the pay table 205). Following the initiation of each wagering game, the gaming device 106 increments the stored hand count value, resulting in a total hand count value of 5 following the period of play.

In the same scenario, following initiation of the fifth wagering game, the gaming device 106 determines that the incremented hand count value of 5 meets the progressive threshold of 5-10 hand counts and assigns the fifth wagering game to a "mini jackpot" progressive award (e.g., jackpot 208 as rendered on the display 108B). The mini jackpot is awarded when a total progressive hand count value meets a progressive hand count threshold or when a contribution of coin-in causes a value of the mini jackpot to meet or exceed a progressive coin-in threshold. The total progressive hand count value can be defined as a total number of hand counts associated with a total number of award-qualifying wagering games initiated at the gaming device 106. The total progressive hand count value can be reset to a seed value, such as zero, following a predetermined time period (e.g., 1 hour, 24 hours, 3 days, etc.) or payout of an associated jackpot.

Continuing the scenario, in response to assigning the wagering game to the mini jackpot, the gaming device 106

(e.g., or another system) contributes a portion of the received coin-in to the mini jackpot and increments a total progressive hand count value by one (e.g., the hand count generated in response to the fifth wagering game that qualified for the mini jackpot). The gaming device 106 determines that the incremented value of the mini jackpot does not meet a progressive coin-in threshold and determines that the total progressive hand count value meets a progressive hand count threshold. In response to determining the satisfaction of the progressive hand count threshold, the gaming device 106 awards the mini jackpot and resets the values of the progressive coin-in threshold and progressive hand count threshold to a seed value, such as zero.

In the same scenario, following the period of play, the input device 110 receives a payout input (e.g., pressing a cash out button) that causes the gaming device 106 (e.g., or another system in communication therewith) to provide the patron with the current credits on the gaming device 106 including the mini jackpot award and a second award based on winnings 207 using the patron's accrued hand counts. The gaming device 106 limits a payout value of the cash out to a 5× multiple of the patron's accrued hand counts; therefore, the gaming device 106 offers a maximum payout award of $25 (e.g., 5 times 5 hand counts).

Figure 3:
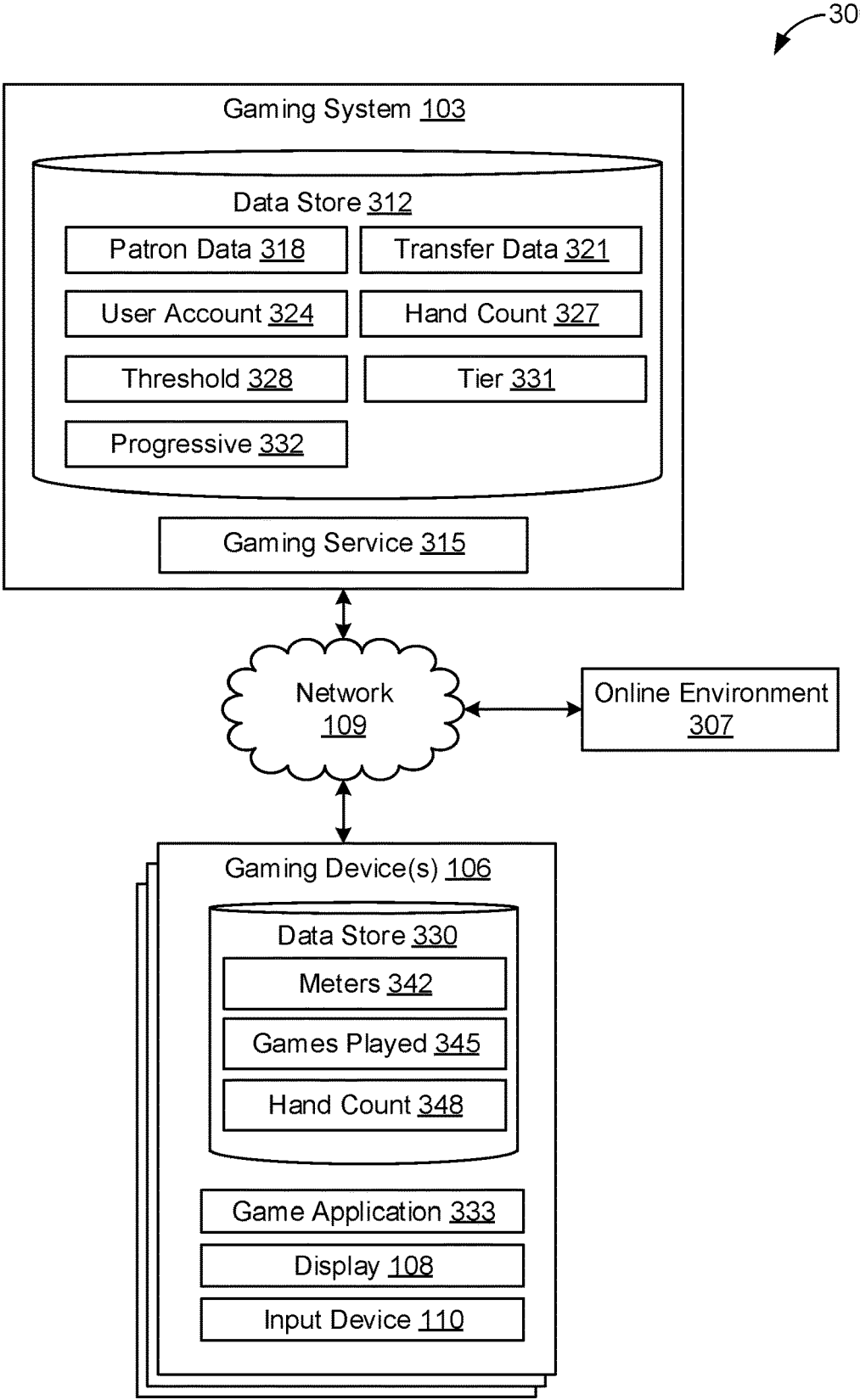
FIG. 3 shows an exemplary gaming environment according to one embodiment of the present disclosure.

FIG. 3 shows a gaming environment 300 includes a gaming system 103 and a gaming device 106, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, and other types of networks. The gaming environment 300 can include one or more online environments 307 in communication with the gaming system 103 and the gaming device 106 via the network 109. The online environment 307 can include games (wagering or not) hosted on one or more online pages. For example, the online environment 307 can include a portal for playing virtual wagering games. In the same example, the online environment 307 can transmit data regarding patron and/or user behavior (e.g., wagering game performance, online hand counts, digital currency, etc.) to the gaming system 103.

The gaming system 103 can include, for example, a point of sale "POS" system, a server computer, or any other system providing computing capability. Alternatively, the gaming system 103 may employ computing devices that may be arranged, for example, in one or more server banks or computer banks or other arrangements. Such computing devices can be located in a single installation or may be distributed among many different geographical locations. For example, the gaming system 103 can include computing devices that together may include a hosted computing resource, a grid computing resource, and/or any other distributed computing arrangement. In some cases, the gaming system 103 can correspond to an elastic computing resource where the allotted capacity of processing, network, storage, or other computing-related resources may vary over time.

Various applications and/or other functionality may be executed in the gaming system 103 according to various embodiments. Also, various data is stored in a data store 312 that is accessible to the gaming system 103. The data store 312 can be representative of a plurality of data stores 312 as can be appreciated. The data stored in the data store 312, for example, is associated with the operation of the various applications and/or functional entities described below.

The components executed on the gaming system 103, for example, include a gaming service 315, and other applications, services, processes, systems, engines, or functionality not discussed in detail herein. The gaming service 315 can be executed to monitor game play on the one or more gaming devices 106 and facilitate additional features on the gaming devices 106. As an example, the gaming service 315 can facilitate the transferring of hand counts from one gaming device 106 to another gaming device 106 and awarding bonuses to a patron, among other features.

The data stored in the data store 312 includes, for example, patron data 318, transfer data 321, thresholds 328, tiers 331, progressives 332, and potentially other data. The patron data 318 can include data for user accounts 324 and hand counts 327, and potentially other data. The user account 324 can include authentication credentials, a user identifier, contact information, user preferences, or other identifying information. The user identifier can correspond to an identifier stored in a magnetic strip of a patron tracking card. In some embodiments, the patron data 318 can correspond to an anonymous patron. As an example, a gaming session of an anonymous patron can be tracked as credits, hand counts, games played, tickets, or other trackable aspects are moved among gaming devices 106.

The progressives 332 can include awarding mechanisms that can be triggered upon satisfying one or more of progressive thresholds 328. The progressive thresholds 328 can include randomly generated values of hand count, coin-in contribution, and other metrics to which progressive values are compared in order to determine if a progressive 332 has been triggered. Each progressive 332 can correspond to a progressive level, which can be grouped together to form a tier 331. Access to each tier 331 or to each progressive 332 within the tier 331 can be controlled via satisfaction of associated assignment thresholds 328.

Each progressive 332 may include a jackpot amount into which a portion of the patron's coin-in may be contributed. Also, each progressive 332 may include a progressive value threshold 328 that, when satisfied, causes payout of the jackpot (or awarding of some other prize) to a patron that caused the progressive value threshold 328 to be satisfied. In one embodiment, the progressive value threshold 328 may be satisfied when a total level of contributions allocated to the progressive 332 reaches a randomly generated magnitude within a range (e.g., that may or may not be indicated/stated to the patron).

For example, a progressive 332 may include an initial, seeded progressive value of $5,000 that is iteratively incremented by a coin-in contribution from each patron assigned to the progressive 332. In the same example, the gaming service 315 may randomly generate the progressive value threshold 328 to be a value $7,893 falling within a stated or unstated range of $5,000-10,000. Also, in the same example, the jackpot of the progressive 332 may be awarded equal to the randomly generated progressive value threshold 328; however, a patron may not be provided an indication of the jackpot (e.g., beyond the stated range) and/or the progressive value threshold 328. Continuing the same example, the progressive value may be iteratively incremented by the coin-in contributions from each patron until the progressive value reaches the progressive value threshold 328 of $7,893. Upon the progressive value reaching the progressive value threshold 328, the patron whose coin-in contribution caused the threshold-satisfying increment may be awarded the jackpot (and/or another award described herein). The seeded progressive value may include a reseed amount corresponding to a portion of the contribution from the previous progressive award.

In one embodiment, the jackpot awarded may be equal to the progressive value threshold 328. In another embodiment, the jackpot may be equal to a standard amount (e.g., such as a $5,000 seed). In other embodiments, the jackpot awarded may be equal to the progressive value when an event occurs, such as a top award is achieved on a gaming device 106 enrolled in the progressive 332. In at least one embodiment, the progressive value threshold 328 may be selected from a range. The lower bound of the range may be equal to a seed value (e.g., such as the standard jackpot amount) plus a portion of a previous progressive value threshold 328. The portion of the contribution received to reach $2,893 (e.g., $7,893 award–$5,000 seed amount) can be contributed to a reseed pool that is added to the seed amount in the next seed. For example, a pool of $148.29 may be accumulated during the $2,893 contribution received when the progressive was awarded. In the same example, the progressive can be seeded to $5,148.29 including the $5,000 seed amount and $148.29 pool.

To randomly generate a subsequent jackpot, a lower range bound may be seeded with an initial $5,000 plus subsequent seed of $148.29, and an upper range bound may be set to a predefined jackpot limit, such as $10,000. The subsequent progressive value threshold 328 may be a randomly generated value falling within the $5,148.29-10,000 range.

In another example, each progressive 332 may include a progressive hand count threshold 328 that, when satisfied, causes payout of the jackpot (or awarding of some other prize) to a patron that caused the progressive hand count threshold 328 to be satisfied. For example, a progressive 332 may include an initial, seeded progressive value of 105 hand counts which is iteratively incremented by hand counts 348 from each patron assigned to the progressive 332. In the same example, the gaming service 315 may randomly generate the progressive hand count threshold 328 to be an unstated value of 351 hand counts. Continuing the same example, the progressive value may be iteratively incremented by hand counts 348 from one or more patrons until the progressive value reaches the progressive hand count threshold 328 of 351 hand counts. Upon the progressive value reaching the progressive hand count threshold 328, the patron whose hand count 348 caused the threshold-satisfying increment may be awarded the jackpot (and/or other award).

In at least one embodiment, the progressive hand count threshold 328 may be randomly selected from a range generated based on a subsequent progressive hand count threshold 328 (similar to selections of progressive value thresholds 328 described herein). In one or more embodiments, the progressive hand count threshold 328 may be randomly selected from a predefined range (e.g., which may be associated with a particular progressive 332 and/or tier 331).

In other embodiments, hand counts can be transferred between gaming devices 106 without utilizing the patron data 318. In these embodiments, a hand count transferred can be facilitated anonymously. For example, a first gaming device 106 can print a ticket that indicates a number of hand counts being transferred and a second gaming device 106 can add the number of hand counts from the ticket to the hand count 348 by redeeming the ticket. The ticketing information can be stored in transfer data 321. In another example, the gaming service 315 can receive an instruction from an attendant to transfer hand counts from a first gaming device 106 to a second gaming device 106. The transfer data 321 can store a history of transfers of hand count.

The gaming device 106 is representative of a plurality of gaming devices that may be coupled to the network 109. The gaming device 106 can include a data store 330, a game application 333, one or more displays 108, and one or more input devices 110, among other components. The data store 330 stores meters 342 including a number of games played 345 on the gaming device 106, a hand count 348, and potentially other values. The meters 342 can include an amount of money wagered on the gaming device 106 referred to as coin-in, an amount won by the gaming device 106 referred to as coin-out, a count of games played on the gaming device 106, an amount of credits currently on the gaming device 106 referred to as current credits, and various jackpot and bonus information, among other meters. In some embodiments, the meters 342 can include games played 345 and hand count 348.

The hand count 348 can correspond to a number of games played in a current gaming session and can be a data object that is not presented to and is inaccessible by a patron. In some embodiments, the hand count 348 can be tracked by the game application 333 as a meter 342 and provided to the gaming service 315. A gaming session can start with the insertion of credits onto a game, with the authentication of a user account, or when some other trigger occurs. A gaming session can terminate when a patron cashes out a machine, when a patron logs out of the gaming devices, or some other trigger occurs. In one example, when credits are initially received by the game application 333, the hand count 348 can be initialized to zero. The hand count 348 can be initialized to or incremented by a hand count credit transferred from another gaming device 106 or gaming session.

In some embodiments, the hand count 348 can be determined as a delta of the current games played 345 plus a buffer value minus initial games played 345 from when the gaming session started. The buffer value can correspond to hand count transferred from another gaming device 106 or gaming session.

In one or more embodiments, the hand count 327 can be a hand count value that is continuously incremented by the remaining hand count 348 (e.g., following the conclusion of a gaming session). For example, the hand count 327 can be a hand count value that is incremented by the hand count 348 each time a payout is initiated at the gaming device 106. In the same example, a patron associated with the hand count 348 and hand count 327 may be presented with indications of only the hand count 348, or only the hand count 327, or neither the hand count 348 nor the hand count 327, or both the hand count 348 and the hand count 327. Also, the hand count 327 can be a measure of the hand counts 348 accrued by groups of patrons organized based on one or more of timing, location, tier 331, progressive 332, or other criteria. For example, the system can update the hand count 327 based on the hand count 348 each time a payout event is initiated at any of a set of gaming devices 106. As an example, the hand count 348 can be decremented based on a cash out event as described herein, and the decremented hand count 348 can be added to the hand count 327 if greater than zero.

The gaming device 106 can include, for example, an amusement device, a slot machine, or other gaming device with a processor-based system such as a computer system. Such a computer system may be embodied in the form of a computing device in a slot machine cabinet, a desktop computer, a laptop computer, personal digital assistants, cellular telephones, smartphones, set-top boxes, music players, web pads, tablet computer systems, game consoles, electronic book readers, or other devices with like capability. The gaming device 106 can include a display 108. The display 108 can include, for example, one or more devices such as liquid crystal display (LCD) displays, gas plasma-based flat panel displays, organic light-emitting diode (OLED) displays, electrophoretic ink (E ink) displays, LCD projectors, or other types of display devices, etc.

The input device 110 can include one or more buttons, touch screens including three-dimensional or pressure-based touch screens, camera, finger print scanners, accelerometer, retinal scanner, gyroscope, magnetometer, or other input devices. The input device 110 can also include a bill acceptor, a player tracking module, a ticket printer, or some other device.

The gaming device 106 can be configured to execute various applications, such as the game application 333 and/or other applications. The game application 333 may be executed in a gaming device 106, for example, to access network content served up by the gaming system 103, and/or other servers, thereby rendering various user interfaces on the display 108. As an example, the game application 333 can render a player tracking user interface on the display 108 that may include or exclude a balance of the hand count 327. In some embodiments, the game application 333 can include, for example, a browser, a dedicated application, etc., and the user interface can be a network page, an application screen, etc. The gaming device 106 can be configured to execute applications beyond the gaming application 133 such as, for example, a patron tracking service window application, email applications, social networking applications, word processors, spreadsheets, and/or other applications.

Next, a general description of the operation of the various components of the gaming environment 300 is provided. To begin, a patron can insert money or a ticket into a bill acceptor or coin acceptor of the gaming device 106. The game application 333 can process the inserted currency or ticket and add credits to the current credits meter 342 (among potentially other meter changes). In some embodiments, the patron may pay an attendant to add credit to a particular gaming device 106. The patron can enter the credit into the gaming service 315, and the gaming service 315 can send a message to the game application 333 to add current credits to the gaming device 106.

The game application 333 can receive an indication of a value of hand count credit and add the value of hand count credit to the hand count 348. The value of hand count credit can be received in response to winning a progressive award. The game application 333 can increment the hand count 348 by the received hand count credit. As an example, the game application 333 can process a ticket to determine the hand count credit. The ticket can be inserted into an input device 110. As another example, a patron can authenticate a patron account on the gaming device 106, such as, inserting a player tracking card into a player tracking module of the gaming device 106 or authenticating using another device via Near Field Communication (NFC), Bluetooth, or some other protocol. The player tracking information can be sent to the gaming service 315, and a hand count 327 from the user account 324 of the patron can be sent back to the game application 333. The game application 333 can increment the hand count 348 based on the received hand count 327. The hand count credit can accompany the coin-in. As an example, a single ticket can include hand count credits and game credits. In some embodiments, the gaming service 315 can store player tracking information associated with gaming activities and other activities associated with the patron in the player tracking information, the player tracking information being stored in the patron data 318.

According to one embodiment, the gaming system 103 can assign a patron (e.g., or wagering games initiated thereby) to one or more tiers 331 and/or one or more player tracking tiers based on the player tracking information, including, for example, hand count credits. The one or more player tracking tiers can be one or more tiers configured in the gaming environment 300, and the one or more player tracking tiers can be used to determine rewards provided to a patron based on their player tracking information. In one example, the one or more player tracking tiers include a bronze tier, a silver tier, and a gold tier, and a patron is assigned to one of the player tracking tiers based on their corresponding player tracking information. In the same example, a patron assigned to a diamond player tracking tier (or other tier) can be rewarded with patron rewards, such as meal vouchers, particular amenities, and other prizes, accesses, or opportunities.

The gaming service 315 can award patron rewards based on hand count thresholds, such as thresholds 328 or other reward thresholds. The hand count thresholds can include, for example, a predetermined number of hand count credits accrued in a particular window of time, such as, for example, a day, week, month, etc., a predetermined number of hand count credits accrued across a predefined set of disparate (or similar) gaming devices 106, a predetermined number of hand count credits accrued on a particular gaming device 106, a particular number of hand count credits awarded form a progressive 332 or other progressive award, and a particular number of hand count credits transferred across the gaming environment 300 (or across elements thereof, such as gaming devices 106).

The reward thresholds can correspond to a published schedule of rewards offered and displayed to patrons in the gaming environment 300. The published schedule can include, for example, 100 hand count credits for a meal voucher, 400 hand count credits for upgraded amenities (such as an upgraded lodging), 600 hand count credits for assignment to a diamond player tracking tier, and 700 hand count credits for free tickets. In one embodiment, the patron can be awarded the rewards incrementally as each threshold is achieved or the patron can awarded only the reward associated with the highest achieved hand count threshold. The highest achieved hand count threshold can be determined at the end of a gaming session or at the end of a predetermined period of time, such as, for example, an hour, day, week month, length of stay at a lodging location. The highest achieved threshold can be determined in response to receipt of a redemption attempt from the patron, which could occur when the patron inserts their player tracking card into a gaming device 106 or a payout machine or a dedicated reward redemption area or machine.

In some embodiments, a patron can utilize the player tracking module to request a number of hand count credits to be transferred to the gaming device 106. For example, a patron may have one hundred accrued hand counts stored in hand count 327, and may request ten of those hand counts to be transferred to a particular gaming device 106. In this example, the gaming service 315 may decrement the hand count 327 by ten and send the ten credits to the game application 333 corresponding to the particular gaming device 106.

The game application 333 can generate one or more outcomes of a wagering game. The term "wagering game" can include non-monetary wagering games or other amusement games, such as social games where virtual currency is wagered or skill-based games that involve wagering. A patron can initiate the wagering game via one or more of the input devices 110 on the gaming devices. As an example, the patron can press a button to initiate the wagering game. The game application 333 can generate one or more outcomes of the wagering game and update the meters 342 based on the outcomes of the wagering game. In one embodiment, the games played 345 and hand count 348 can be incremented by one for each game played. In some embodiments, the games played 345 and/or hand count 348 may be incremented by another amount based on various parameters, such as, for example, a number of lines being wagered in the wagering game, a denomination of the wager game, an eligibility for a bonus, or other parameter. Each wagering game initiated can be eligible to win one or more progressives 332.

In some embodiments, the game application 333 can restrict the incrementing of the hand count 348 based on various parameters. Similarly in some embodiments, the hand count 348 can be restricted from being added to a progressive pool or counting toward a progressive hand count threshold based on those same various parameters among others. In one example, the hand count 348 can be incremented only when an outcome of the wagering game results in a win. According to this example, if the game application 333 generates three wagering game outcomes with two of the outcomes paying an award and one of the outcomes not paying an award, the hand count 348 can be incremented by two.

The game application 333 and the game service 115 can restrict a payout of a gaming device 106 to a multiple of a value of the hand count 348. As an example, a patron can insert a $20 bill into a gaming device 106 that has no coin-in to initiate a gaming session. The patron can initiate ten wagering games, thereby causing the game application 333, the gaming device 106, and/or the gaming service 148 to increment the value of the hand count 348 by ten. Following the ten wagering games, the game application 333 may include a current credit meter 342 that indicates the patron has accrued a current credits balance of $70 on the gaming device 106. If the game application 333 is configured to restrict the patron to receiving $5 per hand count, when a payout is initiated, the game application 333 can limit the payout to $50 corresponding to the incremented value of the hand counts 348 (e.g., ten hand counts) multiplied by $5 totaling $50. The remaining $20 would be unavailable to the patron unless additional wagering games are played or more hand counts 348 are otherwise obtained. For example, the remaining $20 may be provided in a subsequent payout, if the patron initiates at least four additional wagering games (e.g., thereby incrementing a value of the hand count 348 by four).

The usage of $5 per hand count multiple is for illustrative purposes only and other multiples can be used. The multiple can be set by the gaming service 315. In some embodiments, the multiple is fixed by regulators, while in other embodiments, an administrator can set the value via the gaming service 315. As another example, the patron may initiate a hand count transfer, which causes a gaming service 315 to transfer hand counts 327 to the game application 333, whereupon the patron's hand counts 348 are incremented in proportion to the transferred hand counts 327. In the same example, incrementing may include incrementing a hand count meter 342.

Further, a patron can have unutilized hand counts 348 when cashing out at a gaming device 106. In another example, the patron inserts $20 into the gaming device, plays ten wagering games, but has a current credit balance of $20 (e.g., as tracked via a current credit meter 342). In this example, when a payout is initiated, the game application 333 would initiate a payout of the full $20 and decrement hand count 348 by four leaving six hand count 348 on a hand count meter 342, or other hand count 348 tracking metric. In the same example, the remaining six hand counts 348 may be transferred to a gaming service 315, which increments hand counts 327 in proportion to the transferred hand counts 348, thereby storing the unused hand count credit for later use and/or transfer.

The game application 333 can receive a value of hand count credit and a coin-in credit. It can be appreciated that a hand count credit can be transferred to the gaming device 106 at any time, such as, for example, upon winning an award for a progressive 332. The game application 333 can increment the hand count 348 by the hand count credit and the coin-in meter 342 by the coin-in credit. A patron can play one or more wagering games on the gaming device 106, and the game application 333 can increment the hand count 348 for each game played. Once finished, the patron can initiate a cash out of the game. The game application 333 can determine a payout of the wagering game. The payout can correspond to a value of the current credits on the game. For example, the payout can correspond to a current credit meter 342. However, the game application 333 can restrict the payout based to a preconfigured multiple of the hand counts 348. Further, the game application 333 can decrement the hand count 348 based on the payout.

According to one example, if the current credit exceeds a result of the preconfigured multiple multiplied by the hand count 348, the game application can payout the result of the preconfigured multiple multiplied by the hand count 348. Otherwise, the game application 333 can payout the current credits. Further, if the current credit exceeds a result of the preconfigured multiple multiplied by the hand count 348, the game application 333 can set the hand count 348 to zero. Otherwise, the game application 333 can decrement the hand count 348 by rounding up the result of the current credits divided by the preconfigured multiple.

In some embodiments, when a cash out occurs, the game application 333 can automatically send the value of any remaining hand count 348 to the gaming service 315. The remaining hand count 348 can be the value of hand count 348 subsequent to decrementing hand count 348 based on the payout. The value can include the patron identifier along with other data. Once the remaining hand count 348 is transferred to the gaming service 315, the game application 333 can set hand count 348 to zero.

In some embodiments, when a cash out occurs, the game application 333 can print a ticket. The printed ticket can include a value of the remaining hand count 348. In some embodiments, the game application 333 sends the remaining hand count 348 to the gaming service 315 (e.g., that increments a stored hand count 327). In one example, the gaming service 315 can send an identifier to be printed on the ticket. In another example, the game application 333 can determine a next sequential ticket number using a predetermined algorithm. When a patron redeems the ticket at another gaming device 106, the game application 333 can send the identifier read from the ticket to the gaming service 315 and receive back a value of hand count credit.

Figure 4:
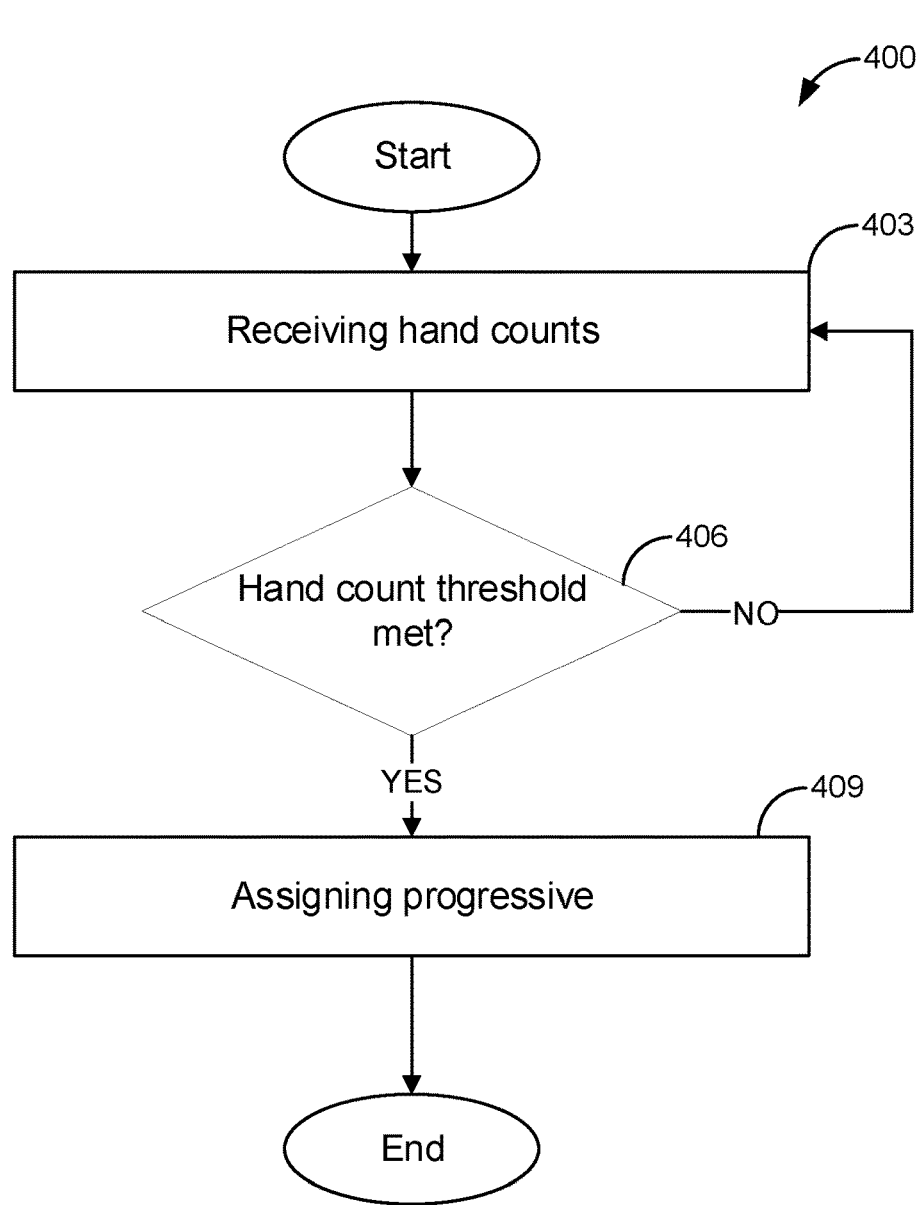
FIG. 4 illustrates an example flowchart of certain functionality implemented by portions of game application executed in a gaming device in the gaming environment of FIG. 3 according to various embodiments of the present disclosure.

Before turning to the process flow diagrams of FIGS. 4 and 5, it is noted that embodiments described herein may be practiced using an alternative order of the steps illustrated in FIGS. 4 and 5. That is, the process flows illustrated in FIGS.

4 and 5 are provided as examples only, and the embodiments may be practiced using process flows that differ from those illustrated. Additionally, it is noted that not all steps are required in every embodiment. In other words, one or more of the steps may be omitted or replaced, without departing from the spirit and scope of the embodiments. Further, steps may be performed in different orders, in parallel with one another, or omitted entirely, and/or certain additional steps may be performed without departing from the scope of the embodiments.

With reference to FIG. 4, shown is a flow chart of a process 400 according to various embodiments of the present disclosure. At box 403, the process 400 includes receiving a hand count 327. Although hand count 327 is referred to herein, it can be appreciated that hand count 348 can be used as well. As an example, the game application 333 can receive a hand count 327 from the gaming service 315. The hand count 327 can be associated with a patron interfacing with a gaming device 106. For example, a patron can insert a ticket into a bill acceptor, the gaming device 106 can process the ticket to obtain a patron identifier, and the gaming application can automatically retrieve the hand count 327 associated with the patron.

At box 406, the process 400 can include determining if one or more progressive hand count thresholds 328 have been met. The one or more progressive hand count thresholds 328 may each be associated with progressives 332 organized in the tier 331. For example, the one or more progressive hand count thresholds 328 can be a set of tiered hand count values. For example, a first progressive hand count threshold 328 may be a hand count measuring at least one hundred and associated with a progressive 332, a second progressive hand count threshold 328 may be a hand count measuring at least 250 and associated with a second progressive 332, and a third progressive hand count threshold 328 may be a hand count measuring at least 500 and associated with a third progressive 332. In the same example, the gaming service 315 may compare a hand count 327 measuring 262 hand counts to each of the progressive hand count thresholds 328 and determine that the hand count 327 satisfies the first and the second progressive hand count thresholds 328. In another example, the gaming service 315 can perform the above comparisons and determinations.

At box 406, if the gaming service 315 (or other system element) determines that the progressive hand count threshold 328 has been satisfied, the process 400 proceeds to box 409. If the gaming service 315 determines that the progressive hand count threshold 328 has not been satisfied, the process 400 may return to box 403. In at least one embodiment, the process 400 may repeat continuously until one or more of the progressive hand count thresholds 328 have been satisfied.

At box 409, the process 400 includes assigning the patron (or the gaming device 106) to one or more progressives 332. As an example, the gaming service 315 can assign the patron to one tier 331 of one or more progressives 332 based on a progressive hand count threshold 328 (or other threshold 328) determined to be satisfied at box 406. In some embodiments, a tier 331 may include zero progressives 332. In at least one embodiment, when assigning tiers 331 of progressives 332, the gaming service 315 may only consider the highest tier 331 of progressives 332 or the tier 331 of progressives 332 with the highest progressive hand count threshold 328 satisfied by the hand count 327. For example, the hand count 327 measuring two hundred and sixty hand counts may satisfy both a one hundred progressive hand count threshold 328 and a two hundred and fifty progressive hand count threshold 328. In the same example, the gaming service 315 may assign the patron to the tier 331 associated with the two hundred and fifty progressive hand count threshold 328, because it is of the higher value. In another example, the hand count 327 of the patron may satisfy a progressive threshold 328 associated with a first tier 331, and the hand count 327 may also satisfy a second tier 331. In the same example, the patron may be assigned to the second tier 331 because of the superior-ranking level thereof.

In one or more embodiments, the gaming device 106 can receive and process inputs for selecting and self-assigning a progressive 332. For example, the gaming application 133 may provide to a patron (e.g., via the display 108) an indication of one or more progressives 332 determined to be satisfied at box 406. In the same example, the game application 333 may receive and process a selection that causes the patron to be assigned to a particular progressive 332.

In at least one embodiment, assignment to a progressive 332 may be restricted to patrons satisfying predefined criteria. For example, a patron may only be assigned to a tier 331 or progressive 332 if the patron selects a maximum betting option on the input device 110. As another example, a patron may only be assigned to a progressive 332 if the patron is a member of an online gaming environment 107, as indicated by the patron's user account 324. In another example, a patron may only be assigned to a progressive 332 if the patron was previously assigned to one or more other tiers 331 or progressives. As another example, a patron may only be assigned to a tier 331 or progressive 332 if, in a previous gaming session, the patron was not assigned to the tier 331 or progressive 332 (or to another, dissimilar progressive 332).

With reference to FIG. 5, shown is a flow chart of a process 500 according to various embodiments of the present disclosure. At box 503, the process 500 includes receiving input. The input can include one or more hand counts 327, one or more hand counts 348, monetary contribution, sequences of indicia, or other gaming or patron-related metrics. For example, the gaming service 315 may receive a hand count 348 from the gaming device 106. The gaming service 315 may receive an indication that outcomes have been determined on a gaming device 106 and associate the hand counts 348 associated with those outcomes to a current user account 324 associated with the gaming device 106. The input may include multiple inputs of one or more hand counts 348. As another example, the gaming service 315 may retrieve a hand count 327 from a data store 312. In another example, the gaming service 315 may receive a coin-in contribution from the gaming device 106. In another example, the gaming service 315 may receive a sequence of indicia generated during execution of a wagering game on the gaming device 106. In at least one embodiment, if a sequence of indicia is received at box 503, the process 500 may proceed immediately to box 509.

Also at box 503, the source of the received input may be recorded. For example, the gaming service 315 may record a patron, user, or other identifier associated with the patron operating the gaming device 106 (or other gaming system) that provided the input.

At box 506, the process 500 includes incrementing a progressive value based on the input received at box 503. For example, the gaming service 315 may receive a hand count 348 at box 503, and, at box 506, may increment a progressive hand count value by the magnitude of the hand count 348 (e.g., typically being one). As another example, the gaming service 315 may receive a coin-in based contribution at box 503, and, at box 506, may increment the progressive value by the magnitude of the coin-in based contribution.

At box 509, the process 500 includes determining if a progressive threshold 328 has been satisfied. To formulate the determination, the progressive value incremented at box 506 (or the sequence of indicia received at box 503) may be compared to the progressive threshold 328. For example, the gaming service 315 may compare an incremented progressive value to a progressive value threshold 328, and, if the progressive value is greater than or equal to the progressive value threshold 328, the gaming service 315 may determine that the progressive value threshold 328 is satisfied. As another example, the gaming service 315 may compare an incremented progressive hand count value to a progressive hand count threshold 328, and, if the progressive hand count value is greater than or equal to the progressive hand count threshold 328, the gaming service 315 may determine that the progressive hand count threshold 328 is satisfied. In another example, the gaming device 106 may compare the set of indicia to a progressive indicia threshold 328 (e.g., a winning sequence of indicia, such as by hitting a winning combination specified in a pay table that corresponds to a progressive 332), and, if the set of indicia matches the progressive indicia threshold 328, the gaming device 106 may determine that the progressive indicia threshold 328 is satisfied. In at least one embodiment, upon determining that the progressive threshold 328 has been satisfied, the process 500 may proceed to box 512. In one or more embodiments, upon determining that the progressive threshold 328 has not been satisfied, the process 500 may return to box 503.

At box 512, the process 500 includes providing an award and resetting a progressive value. To provide the award, the gaming service 315 may identify the patron associated with the input that incremented the progressive value at box 506, thereby causing determination, at box 509, that the progressive threshold 328 is satisfied. For example, the gaming service 315 may retrieve a stored patron identifier associated with the input received at box 503. In the same example, the gaming service 315 may provide the award to the patron associated with the retrieved patron identifier. In some embodiments, the award may be divided among patrons in a group of patrons participating in a community event. An award may be provided by updating the patron's user account 324 and/or patron data 318 to include the award, by transmitting the award to the gaming device 106 with which the patron is interfacing, by transmitting an electronic communication to a payout counter, or the like, or by other award transmission methods.

In a first example, the progressive award may include a jackpot paid out to the patron. In a second example, the progressive award may include suspension of a hand count credit system for metering a payout. For example, a gaming application 133 may normally limit a payout to a multiple of hand count credits accrued during gaming sessions initiated on the gaming device. In the same example, providing the progressive award may cause the gaming application 133 to temporarily suspend the hand count credit payout metering system. In another example, the gaming service 315 can provide hand counts stored in hand counts 327 to the game application 133. The hand counts 327 can be stored associated with a user account 324 from a previous gaming session on the same or different gaming device 106.

The progressive award can provide access to and/or cause initiation of a gaming session. For example, the progressive award can cause the game application 333 to initiate a "bonus" gaming session that may be the same game typically provided by the gaming device 106, or may be a different game. In the same example, the bonus gaming session may be provided only to the patron associated with the input that caused satisfaction of the progressive threshold 328. In an alternate example, the bonus gaming session may be provided to every patron also assigned to the progressive 332 associated with the satisfied progressive threshold 328.

As another example, the progressive award can cause the game application 333 to provide access to the patron to game content including, but not limited to, one or more online environments 307, and online and/or gaming system-based game sections, items, or other game features. In the same example, the game application 333 can cause the gaming service 315 to modify the patron's user account 324 and/or patron data 318 to provide the patron access to the game content in the online environment 307 (e.g., by placing the patron on a white list, removing access barriers to games and in-game content, assigning content to the patron, etc.). The progressive award can unlock or enable access to one or more wagering games on the gaming device 106.

In another example, the progressive award can cause reassignment of the patron to another progressive 332 and/or tier 331. For example, the award can cause the gaming service 315 (or another system element) to reassign the patron from a first tier 331 to a second tier 331. Because each tier 331 may be progressively associated with particular privileges and experiences, advancement of the patron's tier 331 (from a first tier 331 to a second tier 331) can increase the value of prizes that the patron may win subsequent to the progressive award (e.g., a thresholds 328 may specify that the patron has won a progressive 332 from a lower tier 331). As such, the gaming service 315 can move a patron upwards through the tiers 331 upon each win of a progressive 332 in a current tier 331.

Also at box 512, the process 500 includes resetting the progressive value and/or redefining the progressive threshold 328. For example, the gaming service 315 may redefine the progressive threshold 328 by randomly selecting a threshold value from a predefined and/or dynamically generated range. In one example, the gaming service 315 may perform progressive value reset by reseeding the progressive value to a predetermined lower range bound. In the same example, the gaming service 315 may perform progressive threshold 328 redefinition by randomly selecting a new progressive threshold 328 from the predefined and/or dynamically generated range. In another example, the gaming service 315 may perform progressive threshold 328 redefinition by generating a new range (the upper or lower bound of which may be the previously progressive threshold 328—satisfying progressive value), and randomly selecting a value of the new range for use as the new progressive threshold 328.

Figure 6:
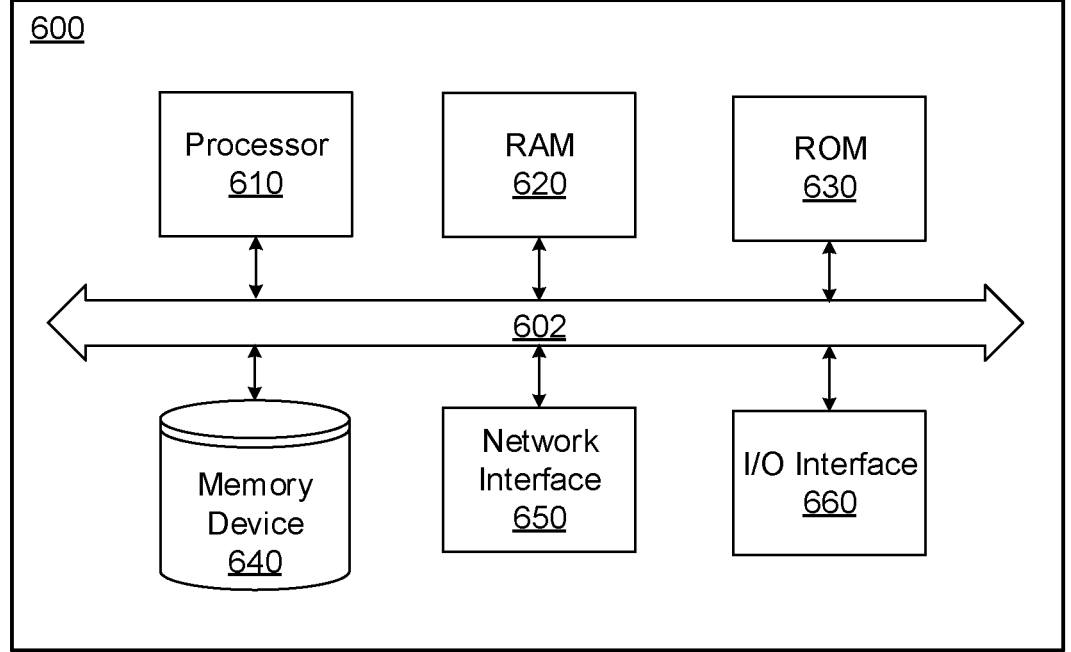
FIG. 6 is a schematic block diagram that illustrates an example computing environment employed in the gaming environment of FIG. 3 according to various embodiments.

Turning to FIG. 6, an example hardware diagram of a computing device 600 is illustrated. Any of the gaming system 103 or the gaming devices 106 may be implemented, in part, using one or more elements of the computing device 600. The computing device 600 can include one or more of a processor 610, a Random Access Memory ("RAM") 620, a Read Only Memory ("ROM") 630, a memory device 640, a network interface 650, and an Input Output ("I/O") interface 660. The elements of the computing device 600 are communicatively coupled via a bus 602.

The processor 610 can include an arithmetic processor, Application Specific Integrated Circuit ("ASIC"), or other types of hardware or software processors. The RAM 620 and ROM 630 can include a memory that stores computer-readable instructions to be executed by the processor 610. The memory device 640 stores computer-readable instructions thereon that, when executed by the processor 610, direct the processor 610 to execute various aspects of the present disclosure described herein. When the processor 610 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 640 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 650 can include hardware interfaces to communicate over data networks. The I/O interface 660 can include device input and output interfaces such as keyboard, pointing device, display, communication, and other interfaces. The bus 602 can electrically and communicatively couple the processor 610, the RAM 620, the ROM 630, the memory device 640, the network interface 650, and the I/O interface 660, so that data and instructions may be communicated among them.

In operation, the processor 610 is configured to retrieve computer-readable instructions stored on the memory device 640, the RAM 620, the ROM 630, or another storage means and copy the computer-readable instructions to the RAM 620 or the ROM 630 for execution, for example. The processor 610 is further configured to execute the computer-readable instructions to implement various aspects and features of the present disclosure. For example, the processor 610 may be adapted and configured to execute the processes described above with reference to FIGS. 2 and 3, including the processes described as being performed by the gaming system 103 or gaming devices 106. Also, the memory device 640 may store the data stored in the data store 312 or 130.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

From the foregoing, it will be understood that various aspects of the processes described herein are software processes that execute on computer systems that form parts of the system. Accordingly, it will be understood that various embodiments of the system described herein are generally implemented as specially-configured computers including various computer hardware components and, in many cases, significant additional features as compared to conventional or known computers, processes, or the like, as discussed in greater detail herein. Embodiments within the scope of the present disclosure also include computer-readable media for carrying or having computer-executable instructions or data structures stored thereon. Such computer-readable media can be any available media which can be accessed by a computer, or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the disclosure may be implemented. Although not required, some of the embodiments of the claimed systems may be described in the context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, functions, objects, components, data structures, application programming interface (API) calls to other computers whether local or remote, etc. that perform particular tasks or implement particular defined data types, within the computer. Computer-executable instructions, associated data structures and/or schemas, and program modules represent examples of the program code for executing steps of the methods disclosed herein. The particular sequence of such executable instructions or associated data structures represent examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Embodiments of the claimed system are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language or other input devices (not shown), such as a microphone, etc. These and other input devices are often connected to the processing unit through known electrical, optical, or wireless connections.

The computer that effects many aspects of the described processes will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the systems are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the system is connected to the local network through a network interface or adapter. When used in a WAN or WLAN networking environment, the computer may include a modem, a wireless link, or other mechanisms for establishing communications over the wide area network, such as the Internet. In a networked environment, program modules depicted relative to the computer, or portions thereof, may be stored in a remote data storage device. It will be appreciated that the network connections described or shown are exemplary and other mechanisms of establishing communications over wide area networks or the Internet may be used.

While various aspects have been described in the context of a preferred embodiment, additional aspects, features, and methodologies of the claimed systems will be readily discernible from the description herein, by those of ordinary skill in the art. Many embodiments and adaptations of the disclosure and claimed systems other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed systems. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed systems. In addition, some steps may be carried out simultaneously, contemporaneously, or in synchronization with other steps.

Aspects, features, and benefits of the claimed devices and methods for using the same will become apparent from the information disclosed in the exhibits and the other applications as incorporated by reference. Variations and modifications to the disclosed systems and methods may be effected without departing from the spirit and scope of the novel concepts of the disclosure.

It will, nevertheless, be understood that no limitation of the scope of the disclosure is intended by the information disclosed in the exhibits or the applications incorporated by reference; any alterations and further modifications of the described or illustrated embodiments, and any further applications of the principles of the disclosure as illustrated therein are contemplated as would normally occur to one skilled in the art to which the disclosure relates.

The foregoing description of the exemplary embodiments has been presented only for the purposes of illustration and description and is not intended to be exhaustive or to limit the devices and methods for using the same to the precise forms disclosed. Many modifications and variations are possible in light of the above teaching.

The embodiments were chosen and described in order to explain the principles of the devices and methods for using the same and their practical application so as to enable others skilled in the art to utilize the devices and methods for using the same and various embodiments and with various modifications as are suited to the particular use contemplated. Alternative embodiments will become apparent to those skilled in the art to which the present devices and methods for using the same pertain without departing from their spirit and scope. Accordingly, the scope of the present devices and methods for using the same is defined by the appended claims rather than the foregoing description and the exemplary embodiments described therein.

The invention claimed is:

1. A system, comprising:
   a data store configured to store a plurality of identifiers; and
   at least one computing device in communication with the data store and a plurality of gaming devices, the at least one computing device being configured to at least:
      authenticate a patron account on a first gaming device of the plurality of gaming devices based on an input from an input device of the first gaming device;
      receive, over a network, a first indication of a first outcome of a wagering game from the first gaming device of the plurality of gaming devices;
      determine an accrued hand count value associated with the patron account and the first gaming device, wherein the accrued hand count value increases based on the first outcome;

determine that the accrued hand count value meets a progressive hand count threshold associated with a progressive, wherein a subset of the plurality of gaming devices are assigned to the progressive;

assign, in response to determining that the accrued hand count value associated with the patron account meets the progressive hand count threshold, the first gaming device to the progressive;

determine, based on a wager amount associated with a second outcome, a progressive value associated with the progressive;

transmit an identifier of the plurality of identifiers associated with the accrued hand count value to the first gaming device; and instruct the first gaming device to print a ticket via a printer, the ticket comprising the identifier;

receive, via a second gaming device of the plurality of gaming devices, a request for the accrued hand count value in response to the second gaming device scanning the ticket, wherein the request comprises the identifier;

retrieve the accrued hand count value from the data store based on the identifier, wherein the accrued hand count value is retrieved based on associating the second gaming device with the patron account; and in response to transmitting the accrued hand count value to the second gaming device, transmit, via the second gaming device, a payout of the progressive, wherein the payout comprises an award based on the second outcome and the progressive value.

2. The system of claim 1, wherein the at least one computing device is further configured to assign the first gaming device to a tier of progressive levels comprising the progressive in response to determining that the accrued hand count value meets the progressive hand count threshold.

3. The system of claim 1, wherein the at least one computing device is further configured to:

determine that the accrued hand count value meets a second progressive hand count threshold that exceeds the progressive hand count threshold; and in response to determining that the accrued hand count value meets the second progressive hand count threshold:

unassign the first gaming device from the progressive; and assign the first gaming device to a second progressive associated with the second progressive hand count threshold.

4. The system of claim 3, wherein a second progressive value the second progressive exceeds the progressive value associated with the progressive.

5. The system of claim 1, wherein the progressive value is increased as a percentage of a particular bet amount.

6. The system of claim 1, wherein determining the progressive value is further based on determining that the second outcome causes the progressive value to exceed a predetermined threshold amount.

7. The system of claim 1, wherein the at least one computing device is further configured to generate a new progressive value associated with the progressive, wherein the new progressive value is equal to a seed amount in addition to a portion of coin in used for contribution to the progressive value that was awarded.

8. The system of claim 1, wherein the at least one computing device is further configured to assign the second gaming device to the progressive based on associating the second gaming device with the patron account.

9. A method performed by one or more computing devices, the method comprising:

authenticating a patron account on a first gaming device of a plurality of gaming devices based on an input from an input device of the first gaming device;

receiving, over a network from the first gaming device of the plurality of gaming devices, a first indication of a first outcome of game;

determining an accrued hand count value associated with the patron account and the first gaming device, wherein the accrued hand count value increases based on the first outcome;

determining that the accrued hand count value meets a progressive hand count threshold associated with a progressive, wherein a subset of the plurality of gaming devices are assigned to the progressive;

assigning, in response to determining that the accrued hand count value associated with the patron account meets the progressive hand count threshold, the first gaming device to the progressive;

determining, based on a wager amount associated with a second outcome, a progressive value associated with the progressive;

transmitting an identifier of a plurality of identifiers associated with the accrued hand count value to the first gaming device, wherein the plurality of identifiers are stored in a data store in communication with the plurality of gaming devices;

instructing the first gaming device to print a ticket via a printer, the ticket comprising the identifier;

receiving, via a second gaming device of the plurality of gaming devices, a request for the accrued hand count value in response to the second gaming device scanning the ticket, wherein the request comprises the identifier;

retrieving the accrued hand count value from the data store based on the identifier; wherein the accrued hand count value is retrieved based on associating the second gaming device with the patron account; and in response to transmitting the accrued hand count value to the second gaming device, transmitting, via the second gaming device, a payout of the progressive, wherein the payout comprises an award based on the second outcome and the progressive value.

10. The method of claim 9, wherein the accrued hand count comprises a total of hand counts accrued by at least one patron.

11. The method of claim 9, further comprising incrementing the progressive value based on a portion of coin in at the first gaming device while the first gaming device is assigned to the progressive.

12. The method of claim 9, further comprising retrieving a pay table associated with a tier comprising the progressive, wherein the payout is determined based on the pay table.

13. The method of claim 9, wherein the accrued hand count value corresponds to a group of gaming devices comprising the first gaming device.

14. At least one computing device comprising one or more processors, configured to:

authenticate a patron account on a first gaming device of a plurality of gaming devices based on an input from an input device of the first gaming device;

receive, from the first gaming device of the plurality of gaming devices, a first indication of a first outcome of game;

determine an accrued hand count value associated with the patron account and the first gaming device, wherein the accrued hand count value increases based on the first outcome;

determine that the accrued hand count value meets a progressive hand count threshold associated with a progressive, wherein a subset of the plurality of gaming devices are assigned to the progressive;

assign, in response to determining that the accrued hand count value associated with the patron account meets the progressive hand count threshold, the first gaming device to the progressive;

determine, based on a wager amount associated with a second outcome, a progressive value associated with the progressive;

transmit an identifier of a plurality of identifiers associated with the accrued hand count value to the first gaming device, wherein the plurality of identifiers are stored in a data store in communication with the plurality of gaming devices;

instructing the first gaming device to print a ticket via a printer, the ticket comprising the identifier;

receive, via a second gaming device of the plurality of gaming devices, a request for the accrued hand count value in response to the second gaming device scanning the ticket, wherein the request comprises the identifier;

retrieve the accrued hand count value from the data store based on the identifier, wherein the accrued hand count value is retrieved based on associating the second gaming device with the patron account; and in response to transmitting the accrued hand count value to the second gaming device, transmit, via the second gaming device, a payout of the progressive, wherein the payout comprises an award based on the second outcome and the progressive value.

15. The computing device of claim 14, wherein the at least one computing device is further configured to restrict a value of the payout based on the accrued hand count value multiplied by a predetermined factor.

16. The computing device of claim 14, wherein the second outcome comprises a plurality of indicia and determining the progressive value comprises identifying a particular combination of indicia in the plurality of indicia along a payline.

17. The computing device of claim 14, wherein determining the progressive value is further based on determining that the second outcome causes the progressive value to exceed a predetermined threshold amount.

18. The computing device of claim 14, wherein determining the progressive value is further based on determining a progressive accrued hand count value meets a progressive hand count threshold.

19. The computing device of claim 14, wherein the at least one computing device is further configured to determine a patron identifier based on the input; and associate the first gaming device with the patron account of a plurality of patron accounts based on the patron identifier.

20. The computing device of claim 14, wherein the at least one computing device is further configured to receive an identifier from the first gaming device read from a ticket inserted into a ticket printer of the first gaming device; and transmit a hand count credit to the first gaming device to cause the first gaming device to add the hand count credit to the accrued hand count value.

* * * * *